United States Patent [19]

Finley et al.

[11] Patent Number: 4,860,281

[45] Date of Patent: Aug. 22, 1989

[54] INDIVIDUAL SUBCHANNEL LOOPBACK IN THE PCM INTERFACES OF A DIGITAL TELEPHONE EXCHANGE WITH CONTROL OF THE OUTBOUND PATH

[75] Inventors: Roger W. Finley, Barrington; Barry D. Lubin, Schaumburg; Bruce A. Bergendahl, Lake Zurich, all of Ill.

[73] Assignee: Motorola, Inc., Schaumburg, Ill.

[21] Appl. No.: 161,884

[22] Filed: Feb. 29, 1988

[51] Int. Cl.$^4$ .............................................. H04J 1/16
[52] U.S. Cl. ......................................... 370/15; 379/5
[58] Field of Search ................ 370/13, 15; 379/5; 371/11, 22, 31

[56] References Cited

U.S. PATENT DOCUMENTS

| | | | |
|---|---|---|---|
| 4,059,229 | 11/1977 | Eddy et al. | 370/15 |
| 4,093,827 | 6/1978 | Lewis . | |
| 4,488,292 | 12/1984 | Troost | 370/63 |
| 4,510,597 | 4/1985 | Lewis | 370/68 |
| 4,563,767 | 1/1986 | Brandt | 375/108 |
| 4,575,841 | 3/1986 | Fagerstedt et al. | 370/15 |
| 4,615,028 | 9/1986 | Lewis | 370/58 |
| 4,616,360 | 10/1986 | Lewis | 370/67 |
| 4,660,194 | 4/1987 | Larson et al. | 370/15 |
| 4,685,102 | 8/1987 | Lewis | 370/15 |
| 4,686,668 | 8/1987 | Koseki et al. | 370/15 |
| 4,688,208 | 8/1987 | Kawaguchi | 370/15 |
| 4,688,209 | 8/1987 | Banzi, Jr. et al. | 370/15 |

OTHER PUBLICATIONS

Joel, Jr., "Digital Switching-How It Has Developed", Electronic Switching: *Digital Central Office Systems Of The World*, IEEE Press, 1982, pp. 1-12.
Mitel Semiconductor, "Microelectronic Product Data Book Issue 3", pp. 5-261 to 5-275; 5-233 to 5.236; and 5-199 to 5-211, Nov. 1986.
American Telephone and Telegraph Co., "Digital Channel Bank Requirements and Objectives", Technical Reference Pub. 43801, Nov. 1982, pp. A1-AII.
American Telephone and Telegraph Co., "High Capacity Digital Service Channel Interface Specification", Technical Reference Pub. 62411, Sep. 1983, pp. i-ii.

*Primary Examiner*—Douglas W. Olms
*Assistant Examiner*—Frank M. Scutch, III
*Attorney, Agent, or Firm*—Raymond A. Jenski; Rolland R. Hackbart

[57] ABSTRACT

A digital radiotelephone exchange having self diagnostic individual subchannel loopback is disclosed. An individual subchannel of an outbound PCM data stream is substituted for an individual subchannel of an inbound PCM data stream. The removed individual subchannel of the inbound PCM data stream is either substituted in the outbound PCM data stream or discarded. Line signal bits may be generated and substituted for the line signal bits of the individual subchannel in the outbound PCM data stream.

22 Claims, 5 Drawing Sheets

INDIVIDUAL SUBCHANNEL LOOPBACK IN THE PCM INTERFACES OF A DIGITAL TELEPHONE EXCHANGE WITH CONTROL OF THE OUTBOUND PATH

BACKGROUND OF THE INVENTION

This invention relates generally to digital telephone exchanges and more particularly to a self diagnostic test feature of a digital telephone exchange which enables complete testing of a single time multiplexed channel without taking an entire trunk of time multiplexed channels out of service. This invention is related to the invention described in U.S. Patent Application No. 161,883, "Digital Telephone Switch with Simultaneous Dual PCM Format Compatibility" filed on behalf of Finley et al. on the same date as the present invention.

One of the advantages of digital telephone equipment is that it lends itself to testing by digital methods, which if properly implemented can eliminate some of the ambiguities attendant in the testing and operation of analog systems such as analog level drift. For the digital methods, bit patterns injected at various points should yield exactly predictable bit patterns at any point in the transmission path.

Many digital exchanges interface their switching subsystem (called herein the switching network) through which calls are routed, all or in part, to the outside world via Time-Division-Multiplexed (TDM) Pulse-Code-Modulated (PCM) four-wire circuits which can carry 24 or 30 or more four-wire speechpaths herein referred to as subchannels. The PCM circuits are herein referred to as "PCM groups". Each subchannel is allocated specific bit positions for speech or data and for channel associated line signaling for trunk use or subscriber line use or for unrelated use. Where the trunks employ common channel signaling, the line signaling bit positions may be used for that purpose, or even go unused, as might also be the case in certain data and audio applications.

A technique known as loopback is often used in telephone systems as a method of testing either the exchange equipment or the facilities that interconnect exchanges or the facilities between an exchange and the customer's premises. Many digital exchanges incorporate loopback, either entire PCM groups or a multiplex of PCM groups (called supergroups) in the digital domain, as a means by which the integrity of a connection or an entire exchange can be qualified, and by which defective componentry and subsections of an exchange can be isolated either automatically or manually.

Looping back all the incoming subchannels in the outgoing direction is generally called "incoming loopback". It is not widely used. Some exchanges may be able to perform this inbound loopback for an entire PCM group. Some PCM terminal equipment is capable of performing this function for test purposes.

Looping back the outbound speech and line signals of a subchannel so that it returns on the incoming input for that same subchannel is referred to herein as "outbound loopback". Another form of looping sometimes called loopback but referred herein as "turnaround" essentially cross-connects an outgoing trunk with a different incoming trunk so that an exchange can complete a test call to itself. One of the problems with outbound loopback and turnaround is that the distant exchange will often "see" spurious data and or line signals. The exchanges on the distant ends of different types of trunks prefer to see, under abnormal conditions or when temporarily busied out or when out of service for repair, different line signaling combinations, which when violated leads to confusion and possible congestion because that office may mark the trunks out of service at their end due to perceived problems.

In the case of PCM group outbound loopback, since the entire group is unusable under these conditions, it is most common to simultaneously transmit an alarm signal toward the distant end.

Flexibility in the treatment of the individual subchannels while not actually carrying traffic would allow more degrees of freedom in test capability commensurate with least disturbances to the distant office.

SUMMARY OF THE INVENTION

Therefore, it is one object of the present invention to provide the PCM interfaces of a digital telephone exchange with flexible capability to loop the outbound speech of one or more subchannels back into the digital exchange while simultaneously transmitting this outbound speech, looped back incoming speech, or quiet line on each such subchannel toward the distant end.

It is another object of the present invention to provide the PCM interfaces of a digital telephone exchange with the capability to loop the outbound line signals, loopback incoming line signals, or route any desired unchanging line signal combination for each subchannel independently.

Accordingly, these and other objects are achieved by the present invention which encompasses a digital telephone exchange with individual subchannel loopback. Individual subchannel loopback is accomplished by substituting at least one of the data bits of a selected subchannel of the serial outbound data which is coupled from the switching network to the distant office for at least one of the data bits of a subchannel of the serial inbound data coupled from the distant office to the switching network.

DESCRIPTION OF THE PREFERRED EMBODIMENT

Figure 1:
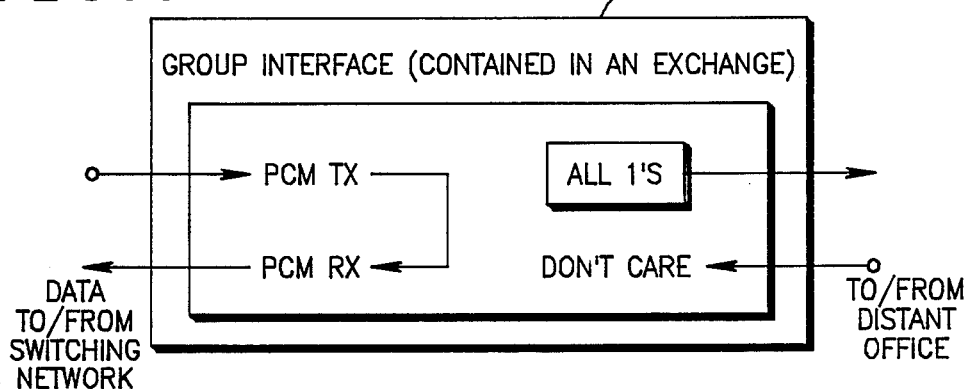
FIG. 1 is a block diagram of a digital exchange group interface coupled in a conventional loopback configuration.

When testing a pulse code modulated (PCM) group in conventional digital telephone exchanges, the entire 24 or 30 subchannel group is looped back to the switch portion of the exchange. Such a conventional loopback is shown in FIG. 1 where a group interface 102 (which may be part of a digital exchange) couples the serial data representing the subchannel group transmitted from the switching network portion (not shown) of the exchange back to the receive input of the interface circuits 102 rather than to the distant office. This results, as far as the distant office is concerned, in all the subchannels contained in the group being tested going out of service to provide the loopback function for a single channel at the group interface connection to the switching network. The group which is in loopback must transmit an all "1" ("out of service") pattern toward the distant office of the telephone network (not shown) to indicate loopback testing. The all "1" pattern may cause synchronization loss at the distant office end.

Figure 2A:
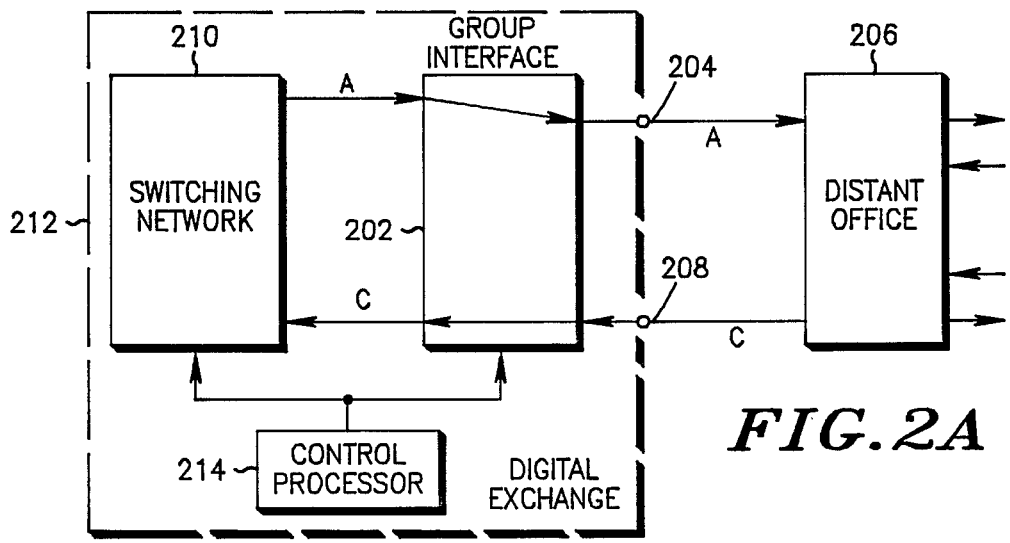
FIGS. 2A–2D are block diagrams of a digital exchange employing the present invention and illustrating normal and individual channel loopback configurations.

The digital telephone exchange including the present invention is shown in FIG. 2A. Group interface 202 couples outbound data, digital audio, and signaling bits for all 24 or 30 channels in a serial PCM data stream, A, on the output port 204 toward the distant office 206. Inbound data, digitized audio, and signaling bits return to group interface 202 via input port 208 in a serial PCM data stream, C. Data stream C is coupled to the switching network portion 210 of a digital exchange 212 and data stream A is output from the switching network 210 to group interface 202.

Figure 2B:
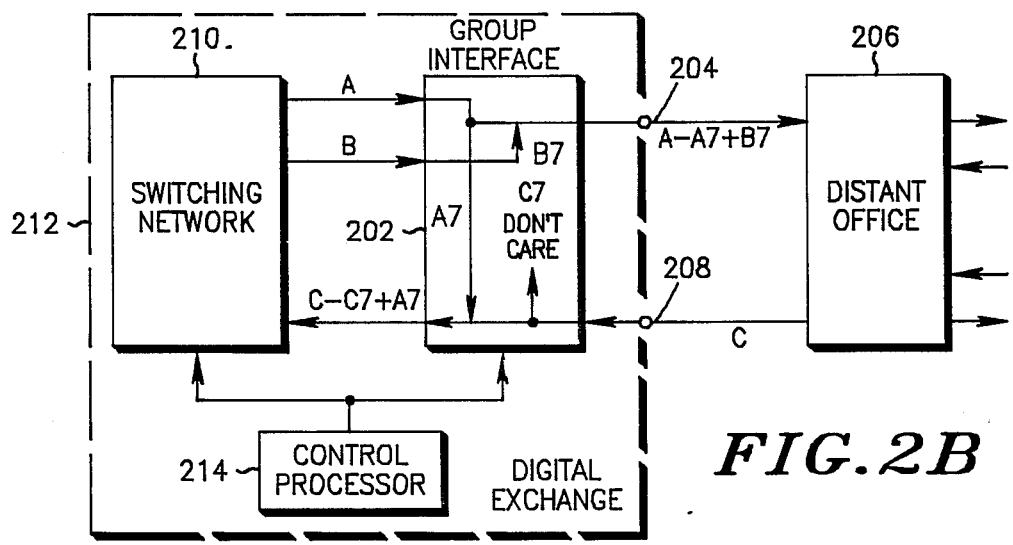
Figure 5:
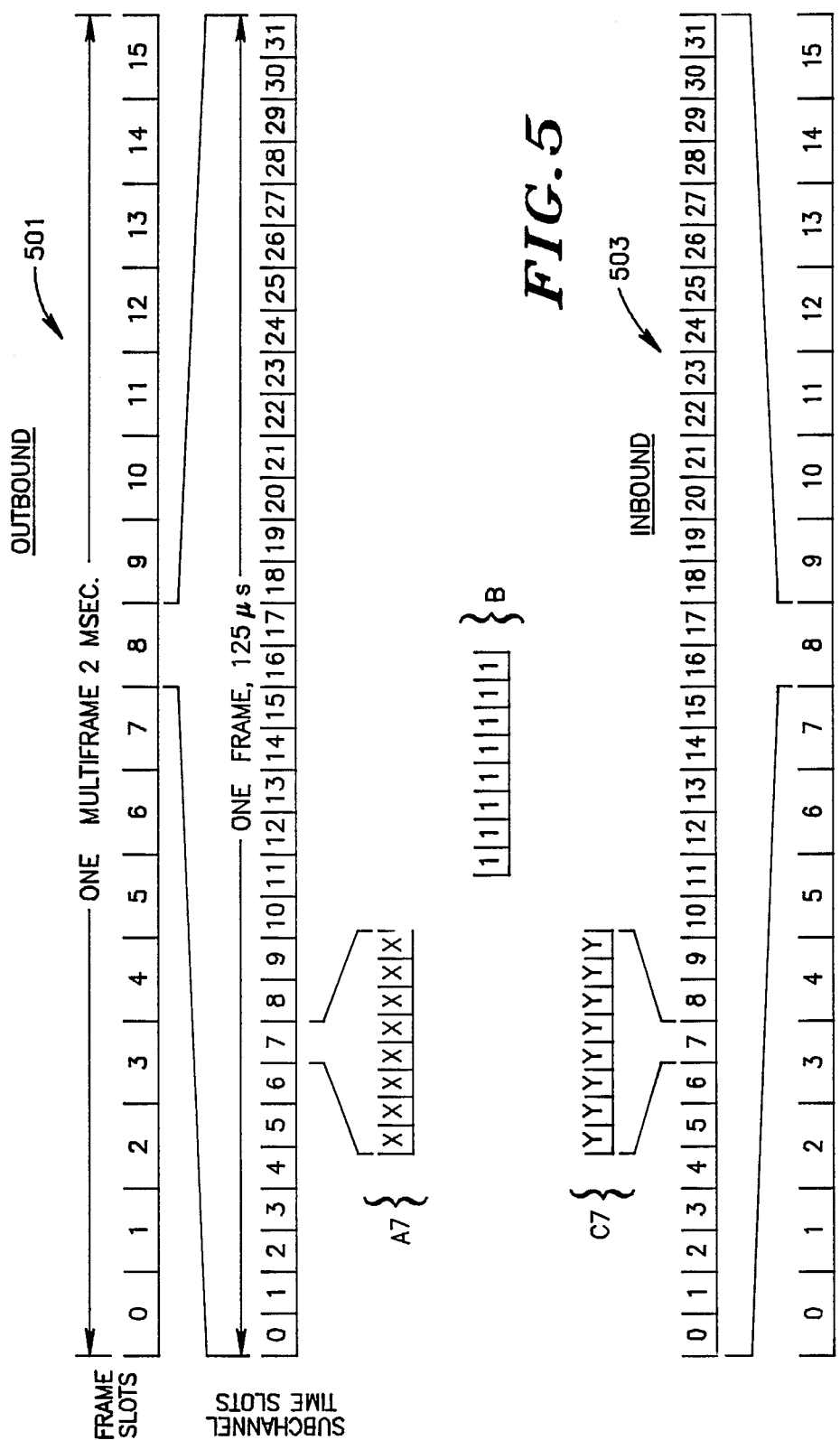
FIG. 5 is a timing diagram of outbound and inbound PCM data streams in the CEPT-30 format.

To avoid the disadvantages of placing an entire PCM group into loopback for diagnostic purposes, a single subchannel may be put into loopback in the present invention by the group interface 202 under command from a control processor 214. A simplified diagram of an individual channel loopback employed in the present invention is shown in FIG. 2B. In the preferred embodiment, group interface 202 receives two data bit streams from switch 210, conventional PCM data stream A and a data stream B which consists generally of eight data bits of predetermined value. (The typical contents of data streams A, B, and C are shown in FIG. 5. Although the bitstream of B is shown as emanating from the switching network 210, it is equally valid that the data bits comprising bitstream B be generated within the group interface 202). It is well known that one bit of a subchannel during specified frames may be employed as a "signaling" or "line signal" bit. This line signal bit may be used to control the subchannel status, for example, to indicate a telephone off-hook condition. In the loopback condition of the preferred embodiment, the line signal bits are given values which prevents the distant office from attempting to use the loop backed subchannel. Since the line signal bits are essentially independent from the remaining bits of the subchannel, they can be handled in a different manner than the subchannel bits. Therefore, it is a feature of the present invention that the subchannel and its associated line signal bits may be independently looped back or routed in accordance with the needs of the system designer.

Referring again to FIG. 2B, the diagnostic test loopback of a single subchannel, 7, for example, may be accomplished by selection of the subchannel 7 timeslot by control processor 214 and the insertion of outbound quiescent signal bits or data byte, B7, in subchannel 7 of the serial PCM data stream output at port 204. The data bits in the subchannel 7 timeslot on the data stream A output from the switch 210 (bits A7) are removed from the serial PCM data stream and coupled to the input switch 210 in subchannel 7 timeslot of data stream C. The subchannel 7 data bits orginially input into input port 208 are discarded from data stream C.

Thus, the serial PCM data stream output from the digital exchange 212 at port 204 consists of the data stream: A−A7+B7. The serial PCM data stream input to the switch 210 consists of the data stream: C−C7+A7. Only a single subchannel has been looped back and the need for taking an entire subchannel group out of service has been negated. At this point it should be obvious that additional subchannels could be looped back in addition to subchannel 7 by similarly coupling the appropriate output timeslots back to the switch 210, subtracting the corresponding timeslot bits from PCM data stream C, and adding corresponding quiescent signal timeslot data to PCM data stream A.

Figure 2C:
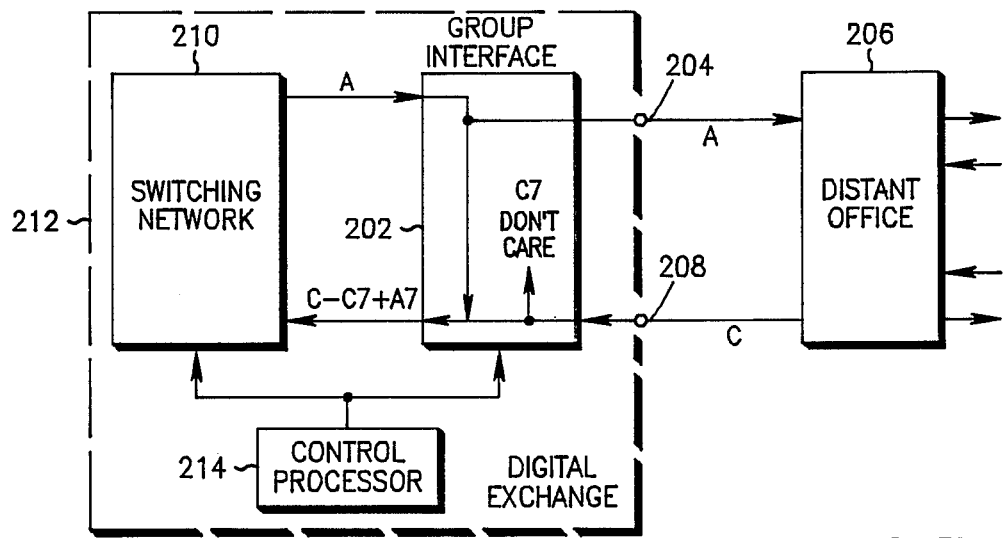
Figure 2D:
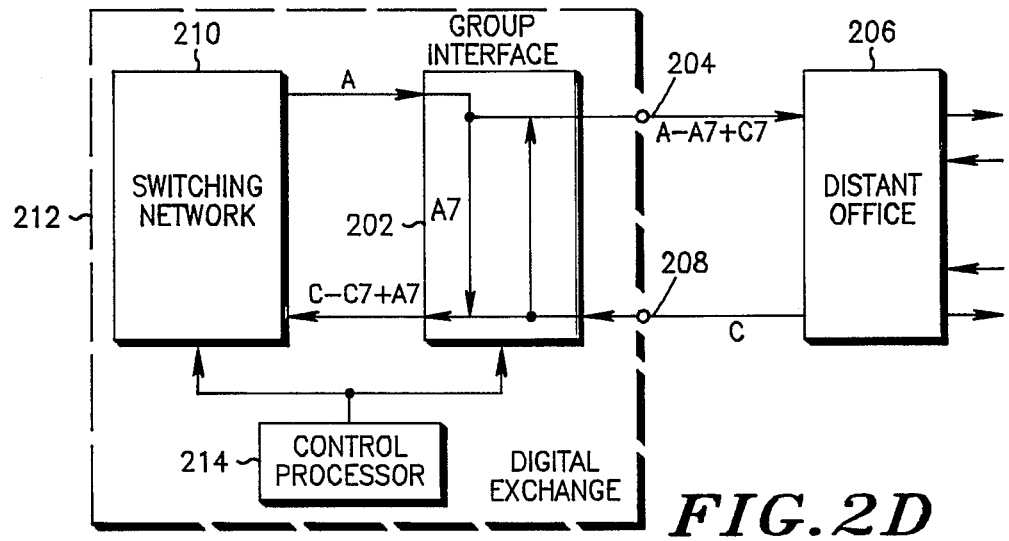

The group interface of the present invention may also have the capability of both looping back a subchannel in A to the switching network 210 while discarding the associated inbound subchannel in C. This capability is shown in FIG. 2C. Furthermore, loopback of subchannels in both A and C may be realized by the group interface 202 as shown in FIG. 2D.

It is desirable that the line signal bits be looped back independently from the subchannel data. In a preferred implementation, line signal bits indicating a busy subchannel are inserted into the appropriate bit timeslots of the associated outbound subchannel and the original line signal bits are looped back to the switching network in the associated inbound subchannel. The line signal bits originally in the associated inbound subchannel are discarded. The remainder of the outbound subchannel bits are removed from the outbound data stream and looped back to the switching network on the inbound data stream. The inbound data stream subchannel, for which the outbound subchannel was substituted, is itself looped back to the outbound data stream. Simply stated, the line signal bits are looped back in accordance with FIG. 2B (outbound data stream line signal bits=A−A7+B7; inbound data stream line signal bits=C−C7+A7) and the subchannel data bits are looped back in accordance with FIG. 2D (outbound data stream=A−A7+C7; inbound data stream=C−C7+A7).

Figure 3:
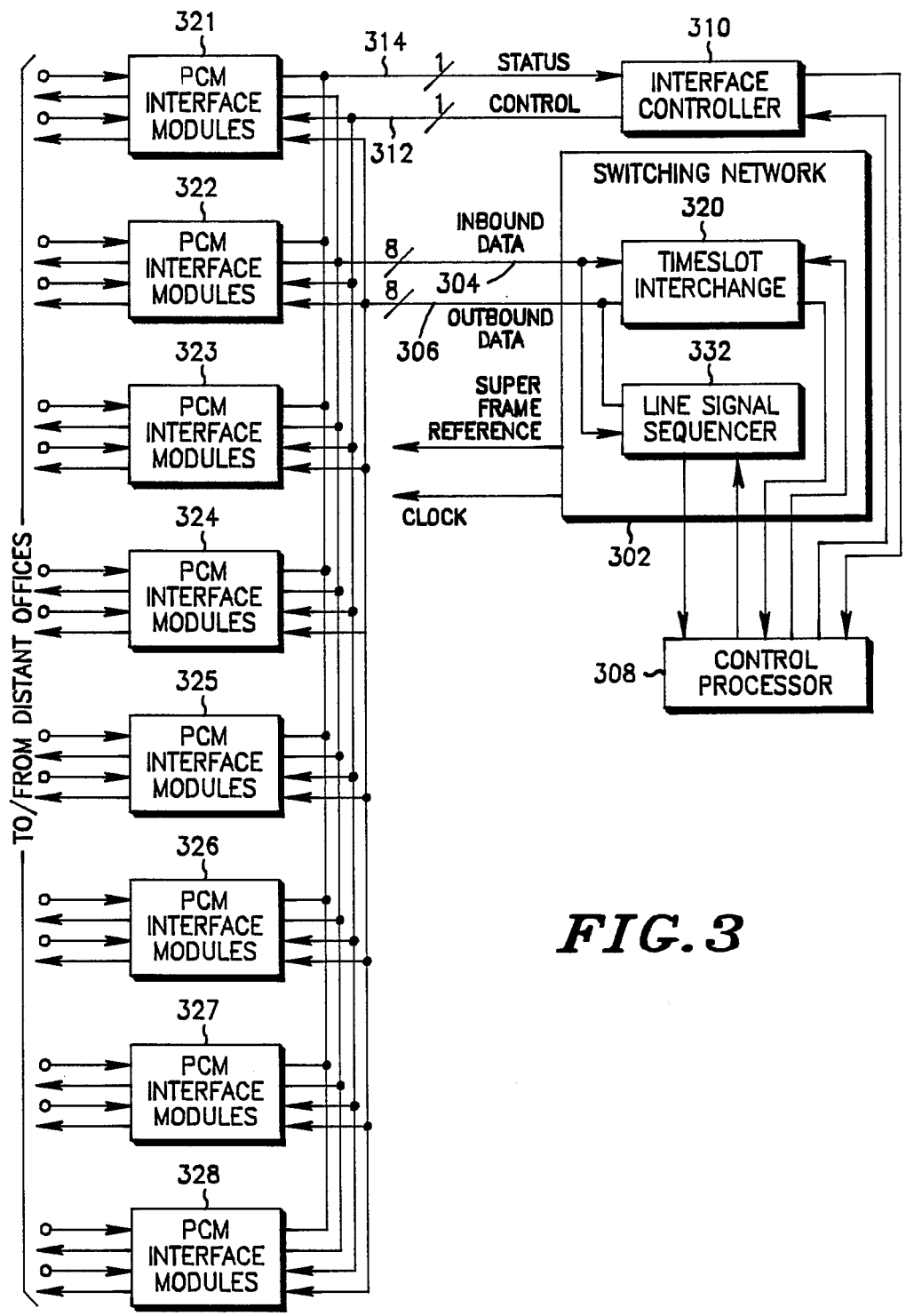
FIG. 3 is a block diagram of a small digital exchange.

Considering the preferred embodiment in greater detail, a small digital exchange is shown in FIG. 3. This exchange serves a maximum of eight interface modules, each of which interfaces two PCM circuits at either 1.544 Mbps or 2.048 Mbps. When serving a total of sixteen CEPT-30 circuits, the small exchange can accommodate a total of 480 subchannels. Synchronization is accomplished by the distribution of a 4.096 MHz clock and a 0.500 KHz superframe reference to the switching network 302, the interface controller 310, and all the interface modules 321–328. Speech and line signaling information between the switching network 302 and the interface modules 321–328 is carried on two 8-bit busses, Inbound Data 304 (inbound meaning from the various interface modules toward the switching network 302) and Outbound Data 306 (outbound meaning from the switching network 302 to the various interface modules). These busses each carry 4.096 megabytes/second, apportioned into 512 bus-timeslots, a byte being allocated to each timeslot during each frame of 125 microseconds. Bus-timeslots are interleaved such that each interface module is assigned every eighth adjacent pair of bus-timeslots and each 24 or 30 subchannel PCM group interface (hereinafter referred to as "interface") is assigned one of this pair, or every sixteenth bus-timeslot. Thus, each interface is allocated 32 bus-timeslots per frame of 125 microseconds, these bus-timeslots being referred to in each respective interface as simply "timeslots," and being numbered 0 through 31. The format of each interface's timeslots on these busses is essentially that of CEPT-30 serial, but in 8-bit parallel form. There are 16 frames in a superframe, numbered 0 through 15. Like CEPT format, during frames 1-15, each timeslot number 16 carries the four-bit channel associated line signals for a pair of subchannels, in the same respective positions as CEPT (subchannels 1 and 16 during frame 1, 2 and 17 during frame 2, etc.).

The exchange's control processor 308 interworks the switching network 302 in the following way:

1. Write instructions to the voice Time Slot Interchange (TSI) 320, thereby controlling the speech paths, and 2. Audit the path status of the TSI 320, and 3a. Write the data to be transmitted on any outbound signaling 4-bit word into the Line Signal Sequencer (LSS) 332, or 3b. Write a cross path instruction in 332 which will cause the 4-bit word to be derived directly from a specified incoming line signal word, and 5. Audit the path status of the LSS 332, and 6. Read the data of any of the 480 incoming signaling 4-bit words in the LSS 332 to detect changes as for call control processing.

Figure 4:
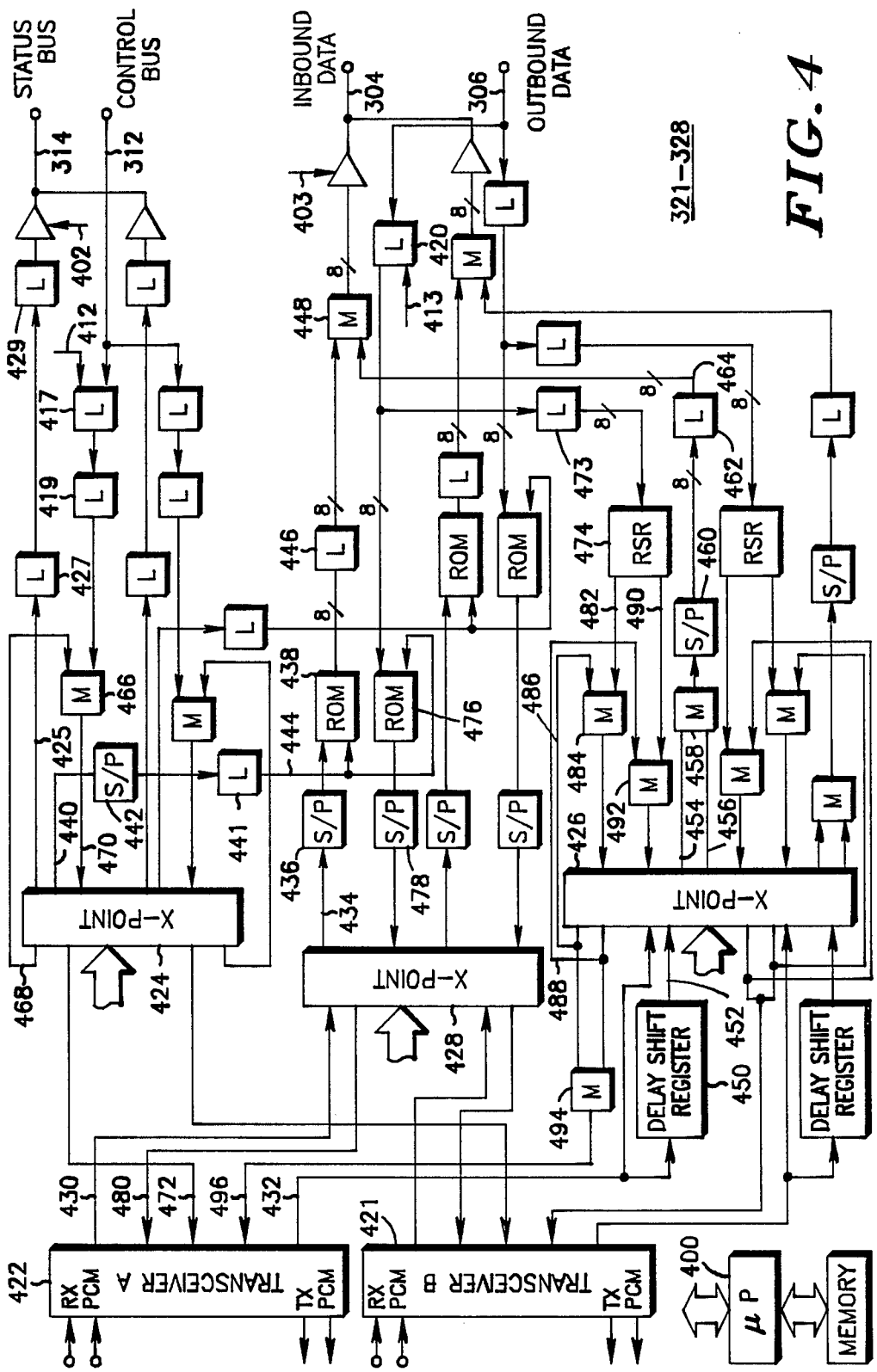
FIG. 4 is a block diagram of one of the PCM interface modules shown in FIG. 3.

Each PCM interface module 321-328 contains two DS-1 or CEPT-30 interfaces. FIG. 4 shows the essential path routing, within a module in block form. Complete interconnection of the microprocessor 400 (for example an MC6809 microprocessor available from Motorola, Inc.) and the timing complexities have been omitted here in the interests of functional clarity but should be apparent to one of average skill in the art. The two interfaces to a distant office may be designated transceiver A and transceiver B, operating independently, except that in practice they share common bus connections, parts, and microprocessor control, and that in certain other variations of this embodiment they are combined into a double-rate PCM interface. Each interface module determines its pair of 32 bus-timeslots by card edge decoding of prearranged edge connector connections to ground to supply voltage. The transceivers 421 and 422 may functionally be MH89760 or MH89780, manufactured by Mitel. In order to provide line to line switching within the interface module, a digital symmetrical matrix (cross-point switch, hereinafter "X-point") may be used. In the preferred embodiment, X-Points 424 and 426 may be MT8980 digital crosspoint switching integrated circuits manufactured by Mitel, and X-Point 428 may be a MT8981 digital crosspoint switching integrated circuit, also manufactured by Mitel. All the Mitel parts operate in frame synchronization. X-Points 424, 426, and 428 are interfaced to the microprocessor 400 via a conventional I/O bus structure on which they operate as peripherals. Timing circuitry employs system clock and superframe reference to generate:

1. Timeslot and frame counting and an internal 2.048 MHz clock; also, module timeslot boundaries, synchronized with the X-Point and transceiver timeslots.

2. Bus-timed outbound strobes once per timeslot per interface. These precede module timeslot boundaries by several bus-timeslots.

3. Bus-timed inbound strobes once per timeslot per interface. These follow module timeslot boundaries by several bus-timeslots. These enable latched tri-state bus drivers on the status bus 314 and the inbound data bus 304, properly timed so that, in FIG. 3, the interface controller 310 and the switching network 302, respectively, will receive these signals.

The delays between the outbound strobing, the module timeslot boundaries, and the inbound strobing permit both interfaces to be logically identical; only the bus-timed strobing is different and then only by one bus-timeslot.

Control processor 308 includes a data base in its associated memory in which the desired operational properties of all of the subchannels and of all of the interfaces is stored. Such a control processor 308 may be a TRN9154B control processor available from Motorola, Inc. Control processor 308, through its interface controller 310, communicates with the interface modules 321-328 via a pair of 4.096 Mbps signal busses: the control bus 312 communicates toward the interfaces to control them and the status bus 314 provides a return communications path on which the interfaces reply and report changes in status. Control bus-timeslot assignments coincide with Outbound Data bus-timeslots. Status similarly coincides with Inbound Data. Each message in either direction is 32 bytes long, and is transmitted one bit per timeslot (32 bits per frame), a different set of bits in each of eight selected frames during a superframe, and is reiterated until receipt is acknowledged by the receiving end. By these paths and a simple protocol, the control processor 308 imposes comprehensive control of the operation of the individual interfaces. One category of message issued by the control processor 308, called the subchannel parameter message, significant to this embodiment is further described following the description of interface operation.

Considering now the operation of a PCM interface module such as that shown in FIG. 4, a serial PCM bit stream is input to one of the RX PCM inputs of transceiver A 422. Transceiver A 422 receives RX PCM and converts the inbound bitstream to conventional Mitel ST-Bus 2.048 Mbps bitstreams, separating the inbound speech on line 430 from the inbound line signals and transceiver status on line 432.

From transceiver 422, the inbound speech on line 430 enters X-Point 428, and in normal operation emerges as a bitstream on line 434. For DS-1/ESF, the 24 subchannels appear on line 434 in timeslots 0-14 and 16-24, in succession, and for CEPT in timeslots 0-14 and 16-30. The bitstream on 434 enters a serial-to-parallel converter 436, which presents, one timeslot later (i.e., 1-15 and 17-25) 8-bit wide speech bytes to translator ROM 438, as 8 of 12 address bits, the other 4 bits being provided by the translator control on line 444. ROM 438 is programmed to contain as many as 16 different 8-bit translations, such as μ-Law to A-Law, A-Law to μ-Law, with or without selected level shifts, bit inversions, ADI or unchanged. The 8-bit parallel output gets latched into latch 446 on a module timeslot boundary; the latch 446 feeds multiplexer 448 which selects speech during all timeslots except 0 and 16, when the signal on line 464 is selected. A bus-timed strobe on line 403 gates a tristate bus driver that feeds this data onto inbound data bus 304 toward the switching network 210.

Transceiver A 422 sends the inbound line signals and transceiver status bitstream on line 432 to X-Point 426, and to a 4-bit delay shift register 450 which feeds a delayed stream on line 452 to X-Point 426. Different models of transceivers format the line signals and status of the signals on line 432 differently. These differences are accommodated by the microprocessor program. Status handling is described above, in the discussion of status bus 314.

For the DS-1/ESF compatible transceivers (MT89760), the 24 sets of inbound line signals appear on line 432 reiteratively as four bits of every three out of four timeslots, 0, 1, 2, 4, 5, 6, 8, ... The microprocessor 400 sets up the X-Point 426 to route inputs 432 and 452 to outputs 454 and 456 as follows. Timeslots 0-14 of the bitstream on line 454 contain the line signals of subchannels 1-15 as received on line 432. Timeslots 0-8 of the bitstream on line 456 contain the line signals of subchannels 16-24 as received on line 452, therefore shifted in position four places. Multiplexer 458 selects the first four bits of a timeslot from line 454 and the second four from 4-bit delayed line 456, thus double packing the line signals of subchannels 1 and 16 during timeslot 0, 2 and 17 during timeslot 1, and so forth, feeding serial-to-parallel converter 460 which forms these pairs of 4-bit line signals into parallel words. One timeslot later latch 462 captures only one such pair each frame, that of timeslot 1 during frame 1, timeslot 2 during frame 2, and so forth through frame 15. During timeslot 16 of each frame, multiplexer 448 merges these line signals on 464 into the inbound data bus 304 toward the switching network 210 (or 302).

For the CEPT compatible transceivers (MH89780), the line signals are already double packed as per the switching network's requirements, but the above hardware remains identical. X-Point 426 routes the line signals on line 432 to timeslots 0-14 of both lines 454 and 456, so the line signals emerge in latch 462 during timeslots 1-15, to be available during timeslot 16 in correct order, multiplexed by multiplexed 448 into inbound data on bus 304.

Timeslot 0 of the outbound bus 306 is provided by the switching network 302 (or 210) and timeslot 0 of inbound bus 304 is provided by X-Point 426 (because of the slot delay, in its timeslot 31), and is initialized by the microprocessor 400.

The microprocessor 400 preestablishes the X-Point path in X-Point 424 from line 470 to line 468 as an identity in all 32 time slots to provide refresh. (Interface transceiver "B" 421 of FIG. 4, being logically connected the same of interface transceiver A 422, works in similar fashion). In each timeslot, one bit of the control line 312 is latched into latch 417 by a bus-timed strobe line 412 and then transferred into latch 419 on an occurrance of a module timeslot boundary. During eight selected frames of each superframe this bit is then merged into refreshing the reiterative bitstream on line 468 at a frame-dependent bit position within the current timeslot by a multiplexer 466 (which may be a conventional 74LS157 or equivalent) to form an updated reiterative bitstream on line 470, which is the current control message in serial form. The microprocessor 400 has access to all thirty-two bytes of a control message, one at a time, by periodically interrogating the X-Point 424. It uses this information to establish operational parameters, including:

1. Formatting the reiterative bitstream on line 472 in transceiver compatible form, and
2. Formatting the reiterative timeslots of the bitstream on outbound line 496, such as frame alignment and non-frame alignment information, and
3. Formatting the reiterative bitstream on line 440 which is used for translation instructions for individual subchannels, and
4. Performing specific tests and diagnostics, and
5. Reporting selected abnormalities in operation.

The microprocessor 400 monitors transceiver A 422 status information of the reiterative bitstream on the inbound signals and status line 432 by periodically interrogating its salient timeslots in X-Point 426. Changes in status reported by the transceiver A 422 as well as other abnormalities and acknowledgments of control messages are formatted into thirty-two byte messages which the microprocessor 400 writes into X-Point 424, so that the entire message is reiterated every frame on the bitstream of line 425. Each timeslot of eight selected frames of a superframe, a frame-dependent bit of this message is captured by latch 427, and then transferred at a module timeslot boundary to latch 429, from whence it is strobed by the bus-timed strobe line 402 onto status bus 314. Thus the entire status message is reiterated on bus 314 once every superframe.

The reiterative bitstream on line 440 feeds through serial-to-parallel converter 442 to latch 441, which provides up to eight bits on line 444, four each for inbound translator 438 and outbound translator 476.

Outbound data (speech and line signals) on the bus 306 is strobed each timeslot into latch 420 by the bus-timed signal on line 413. Each speech byte thus latched feeds translator ROM 476, which translation is determined by the four bits of line 444. The ROM is programmed to contain as many as 16 different 8-bit translations, such as µ-Law to A-Law, A-Law to µ-Law, with or without selected level shifts, bit inversions, ADI or unchanged. The output of ROM 476 feeds parallel-to-serial converter 478 which in turn provides a continuous speech bitstream to X-Point 428. The microprocessor 400 sets up to the paths in X-Point 428 to the speech bitstream on outbound speech line 480. For CEPT this is identity, but for DS-1/ESF the timeslots are shifted to meet the transceiver (MH89760) device requirements.

Outbound line signals, 4-bits per subchannel, two subchannels per frame, are packed into timeslot 16 of the outbound data bus 306. During timeslot 16 of each frame, latch 473 captures the contents of 8-bit latch 420, which is then made available to conventional ring shift register 474 at the end of timeslot 31. During each timeslot of each frame, ring shift register 474 is clocked around on itself so that output on line 482 is bit-for-bit aligned with the X-Point 426 timeslots and the output on line 490, half around the ring, appears aligned to a X-Point 426 timeslot as "nibble-swapped". In only the timeslots used by the particular transceiver model for line signals, the microprocessor 400 sets up X-Point 426 for identity from the output of multiplexer 484 (which may be a 74LS157) to refreshing the reiterative bitstream on line 486 and from the output of multiplexer 492 (which also may be a 74LS157) to refreshing the reiterative bitstream on line 488. The microprocessor 400 writes reiterative instructions for the transceiver in other timeslots, such as frame alignment words and transceiver control commands.

Multiplexers 484 and 492 merge line 482 and line 490 with the refreshing bitstreams on lines 486 and 488, respectively, to accomplish updating during one timeslot of a frame. The selected sequence of timeslots is frame-dependent and transceiver model-dependent, and is such as to merge the line signals on lines 482 and 490 for their respective subchannels into the exact timeslots required by the particular transceiver model. Multiplexer 494 selects appropriately from the straight-through line signals of line 486 and the nibble-swapped line signals on line 488 to construct the outbound line signal stream on line 496 to the transceiver A 422. The differences in DS-1/ESF and CEPT timing are accommodated by differences in programmable array logic in the timing circuitry. The transceiver A 422 thus is provided with the control, line signals and speech bitstreams to be able to transmit TX PCM.

Control processor 308 uses the subchannel parameter message to control the preferred embodiment of the present invention. During initialization, the interface receives and acknowledges one subchannel parameter message for each of its subchannels, as described above; any of these may be updated at any time thereafter. A message in this category establishes all of the unique parameters of a specified subchannel, including all the information required of the transceiver, the translation control information, and, of significance to this embodiment, the subchannel loopback control information, including the disposition of the PCM connection toward the distant office.

The translation information provided by a subchannel parameter message is used by the microprocessor 400 to write the required translations as the first eight bits of a timeslot, one timeslot early (i.e., for subchannel 1 in timeslot 0, etc.), in the reiterative bitstream on line 440 in X-Point 424.

The loopback information provided by a subchannel parameter message is used to establish loopback conditions, including:

1. Normal, transceiver loopback, or interface loopback.

2. If in transceiver loopback, the functional operation is as defined by the model of transceiver in use and the interface operation will otherwise be as described above.

3. If in interface loopback, the microprocessor 400 will establish paths and/or reiterative timeslots in X-Points 426 and 428 to accomplish the following:

a. The outbound line signal condition in the bitstream on line 496. This may be either the subchannel's line signals of the bitstream on line 432 or any permitted combination of the four line signal bits, which will be reiterated until loopback is removed.

b. The outbound speech condition in the bitstream of line 480. This may be either the subchannel's speech of the bitstream on line 430 or "quiet line".

c. The inbound speech/data and line signal condition of a specified subchannel at bus 304 will be that received from the switching network 302 on bus 306 on the corresponding subchannel. The speech/data will be subject to the two translations, first by ROM 476 and then by ROM 438.

One category of control message transmitted to an interface is the group service message, used to remove the entire PCM group from service, or to attempt to restore it to service. This message permits a number of options on the information presented toward the switching network, including each of the following, always while sending the appropriate alarm condition toward the distant end:

1. On-hook quiet line, as provided by the transceiver 422 when it is removed from service, as when it alarms due to defects in the RX PCM.

2. Looped back outbound data and line signals from bus 306 to inbound bus 304, subject to current translations, achieved by path connection manipulation in X-Points 426 and 428.

3. Looped back outbound data and line signals from bus 306 to inbound bus 304, subject to current translations, achieved by execution in the transceiver 422.

4. Looped back outbound data and line signals from bus 306 to inbound bus 304, subject to unchanged translations. This is achieved by path connection manipulation in X-Points 426 and 428, and manipulation of the reiterative translation bitstream on line 440 by X-Point 424. When normal service is restored, the previous translations will be restored. If the interface is placed in service while the transceiver is in alarm due to defects in RX PCM, as soon as the alarm condition is removed in the transceiver, the interface resumes normal operation.

In an alternative embodiment, the transceivers 421 and 422 of FIG. 4 may be replaced by a single transceiver that operates in DS-1C protocol at about 3.152 Mbps, appropriately interleaving the speech/data and line signals of two DS-1/ESF circuits. In a further version of this alternative embodiment, the transceivers 421 and 422 of FIG. 4 may be replaced by a single transceiver that operates at 4.096 Mbps, combining the speech/data and line signals of two CEPT circuits.

Referring now to FIG. 5, two CEPT format PCM bitstreams are illustrated, outbound 501 and inbound 503. As described previously, a loopback of a single subchannel may be achieved in the present invention by selecting a single subchannel (A7) from the outbound frame 501 and replacing it with appropriate data bits (B) in the seventh subchannel time slot. The data bits of subchannel A7 are substituted for the data bits of subchannel C7 of the inbound data PCM bitstream 503. C7 data bits may be discarded.

In summary, then, a digital telephone exchange having individual subchannel loopback with separate control of the outbound path has been shown and described. This individual channel loopback is achieved by removing the data bits of a selected subchannel from the PCM data stream emanating from the exchange switch network. In the emptied timeslot, a generated series of test data bits are inserted and transmitted, as part of the PCM data stream, to the distant office. The inbound PCM data stream from the distant office has the data bits from a corresponding subchannel removed and the data bits from the selected outbound subchannel inserted in the emptied timeslot. The interface can, for any combination of subchannels, loop back outbound speech and/or line signals, while either transmitting the outbound or looping back inbound, speech and/or line signals, or providing minimum disruptive status outbound. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A digital telephone exchange with individual subchannel loopback, comprising:
   means for coupling serial outbound data comprising a first plurality of digital subchannels from a switching network to a distant office;
   means for coupling serial inbound data comprising a second plurality of digital subchannels unlike said first plurality of digital subchannels from said distant office to said switching network; and
   means for substituting at least one bit of a predetermined one of said first plurality of digital subchannels for at least one bit of one of said second plurality of digital subchannels in said serial inbound data while maintaining coupling of said means for coupling serial outbound data.

2. A digital telephone exchange in accordance with claim 1 wherein said means for coupling serial outbound data further comprises a pulse code modulated transceiver.

3. A digital telephone exchange in accordance with claim 1 wherein said means for coupling serial inbound data further comprises a pulse code modulated transceiver.

4. A digital telephone exchange in accordance with claim 1 wherein said means for substituting further comprises a digital symmetrical matrix switching circuit coupled to a serial to parallel converter.

5. A digital telephone exchange with individual subchannel loopback, comprising:
 means for coupling serial outbound data comprising a first plurality of digital subchannels from a switching network to a distant office;
 means for coupling serial inbound data comprising a second plurality of digital subchannels unlike said first plurality of digital subchannels from said distant office to said switching network;
 means for generating at least one first data bit independent of said serial outbound data and said serial inbound data;
 means for substituting said at least one first data bit for at least one second data bit of a predetermined digital subchannel of said first plurality of subchannels in said outbound data; and
 means for substituting said at least one second data bit for at least one third data bit of a predetermined digital subchannel of said second plurality of subchannels in said serial inbound data.

6. A digital telephone exchange in accordance with claim 5 wherein said means for substituting said at least one first data bit further comprises a digital symmetrical matrix switching circuit coupled to a serial to parallel converter.

7. A digital telephone exchange in accordance with claim 5 wherein said means for substituting said at least one second data bit further comprises a digital symmetrical matrix switching circuit coupled to a serial to parallel converter.

8. A digital telephone exchange with individual subchannel loopback, comprising:
 means for coupling serial outbound data comprising a first plurality of digital subchannels from a switching network to a distant office;
 means for coupling serial inbound data comprising a second plurality of digital subchannels unlike said first plurality of digital subchannels from said distant office to said switching network;
 means for substituting a predetermined one of said first plurality of digital subchannels for one of said second plurality of digital subchannels in said serial inbound data while maintaining coupling of said means for coupling serial outbound data;
 means for substituting said one of said second plurality of digital subchannels for said predetermined one of said first plurality of digital subchannels in said serial outbound data while maintaining coupling of said means for coupling said inbound data.

9. A method of individual channel loopback for a digital telephone exchange, comprising the steps of:
 coupling serial outbound data comprising a first plurality of digital subchannels from a switching network to a distant exchange;
 coupling serial inbound data comprising a second plurality of digital subchannels unlike said first plurality of digital subchannels from said distant office to said switching network; and
 substituting at least one bit of a predetermined one of said first plurality of digital subchannels for at least one bit of one of said second plurality of digital subchannels in said serial inbound data while maintaining coupling of said means for coupling serial outbound data.

10. A method of individual channel loopback for a digital telephone exchange, comprising the steps of:
 coupling serial outbound data comprising a first plurality of digital subchannels from a switching network to a distant exchange;
 coupling serial inbound data comprising a second plurality of digital subchannels unlike said first plurality of digital subchannels from said distant office to said switching network;
 generating at least one first data bit which is independent of said serial outbound data and said serial inbound data;
 substituting said at least one first data bit for at least one second data bit of a predetermined digital subchannel of said first plurality of subchannels in said outbound data; and
 substituting said at least one second data bit for at least one third data bit of a predetermined digital subchannel of second plurality of subchannels in said serial inbound data.

11. A digital telephone exchange with self diagnostic individual subchannel loopback, comprising:
 means for generating independent quiescent data bits;
 means for substituting said quiescent data bits for first line signal data bits of a predetermined digital subchannel of an outbound pulse code modulated serial data bitstream to a distant office, further comprising:
 (a) a parallel to serial converter and
 (b) a digital symmetrical matrix coupled to said parallel to said converter; and
 means for substituting said first line signal data bits for second line signal data bits of a predetermined digital subchannel of an inbound pulse code modulated serial data bitstream from a distant office, further comprising:
 (a) said digital symmetrical matrix and
 (b) a serial to parallel converter coupled to said digital symmetrical matrix.

12. A digital telephone exchange with self diagnostic individual subchannel loopback, comprising:
 means for coupling a serial outbound pulse code modulated serial data bitstream comprising a first plurality of digital subchannels from a switching network to a distant office;
 means for coupling a serial inbound pulse code modulated serial data bitstream comprising a second plurality of digital subchannels unlike said first plurality of digital subchannels from said distant office to said switching network;
 means for substituting at least one bit of a predetermined one of said first plurality of digital subchannels for at least one bit of one of said second plurality of digital subchannels while maintaining coupling of said means for coupling a serial outbound pulse code modulated serial data bitstream, further comprising:
 (a) a parallel to serial converter and
 (b) a digital symmetrical matrix coupled to said parallel to serial converter; and means for substituting said at least one bit of one of said second plurality of digital subchannels for said at least one bit of predetermined one of said first plurality of digital subchannels while maintaining coupling of said means for coupling a serial inbound pulse code modulated serial inbound data bitstream, further comprising:
(a) said digital symmetrical matrix and
(b) a serial to parallel converter coupled to said digital symmetrical matrix.

13. A digital telephone exchange with self diagnostic individual subchannel loopback and control of outbound path, comprising:
means for coupling an outbound serial data bitstream comprising a first plurality of digital subchannels from a switching network to a distant office;
means for coupling an inbound serial data bitstream comprising a second plurality of digital subchannels unlike said first plurality of digital subchannels from said distant office to said switching network;
means for substituting one of said first plurality of digital subchannels for one of said second plurality of digital subchannels;
means for generating a predetermined series of data bits independent of said serial outbound data bitstream and said serial inbound data bitstream;
means for substituting said predetermined series of data bits for first line signal data bits of a second one of said first plurality of digital subchannels; and
means for substituting said first line signal data bits for line signal second data bits of a second one of said second plurality of digital subchannels.

14. A digital telephone exchange in accordance with claim 13 further comprising means for substituting said one of said second plurality of digital subchannels for said one of said first plurality of digital subchannels.

15. A digital telephone exchange in accordance with claim 14 wherein said means for substituting said one of said second plurality of digital subchannels further comprises a digital symmetrical matrix and a parallel to serial converter coupled to said digital symmetrical matrix.

16. A digital telephone exchange in accordance with claim 13 wherein said means for substituting one of said first plurality of digital subchannels further comprises a parallel to serial converter and a digital symmetrical matrix coupled to said parallel to serial converter.

17. A digital telephone exchange in accordance with claim 13 wherein said means for substituting said predetermined series of data bits further comprises a parallel to serial converter and a digital symmetrical matrix coupled to said parallel to serial converter.

18. A digital telephone exchange in accordance with claim 13 wherein said means for substituting said first line signal data bits for second data bits further comprises a digital symmetrical matrix and a parallel to serial converter coupled to said digital symmetrical matrix.

19. A digital telephone exchange in accordance with claim 5 wherein said means for substituting said at least one first data bit further comprises means for maintaining coupling of said means for coupling serial outbound data during substitution of said at least one first data bit for said at least one second data bit.

20. A digital telephone exchange in accordance with claim 5 wherein said means for substituting said at least one second data bit further comprises means for maintaining coupling of said means for coupling serial inbound data during substitution of said at least one second data bit for said at least one third data bit.

21. A method in accordance with the method of claim 10 wherein said step of substituting said at least one first data bit further comprises the step of maintaining coupling of said serial outbound data during substitution of said at least one first data bit for said at least one second data bit.

22. A method in accordance with the method of claim 10 wherein said step of substituting said at least one second data bit further comprises the step of maintaining coupling of said serial inbound data during substitution of said at least one second data bit for said at least one third data bit.

* * * * *

UNITED STATES PATENT AND TRADEMARK OFFICE
CERTIFICATE OF CORRECTION

PATENT NO. : 4,860,281

DATED : August 22, 1989

INVENTOR(S) : Roger W. Finley, Barry D. Lubin, Bruce A. Bergendahl

It is certified that error appears in the above-identified patent and that said Letters Patent is hereby corrected as shown below:

Column 12, line 39, "to said converter" should read --to serial converter--.

Signed and Sealed this

Eleventh Day of September, 1990

Attest:

HARRY F. MANBECK, JR.

*Attesting Officer*  *Commissioner of Patents and Trademarks*